United States Patent [19]

Itoh et al.

[11] 4,429,863
[45] Feb. 7, 1984

[54] MANUAL/AUTOMATIC PAPER FEED MECHANISM IN A COPYING MACHINE

[75] Inventors: Fukusaburo Itoh; Kazushige Mizumoto; Yoshikazu Nishikawa, all of Nara, Japan

[73] Assignee: Sharp Kabushiki Kaisha, Osaka, Japan

[21] Appl. No.: 298,540

[22] Filed: Sep. 2, 1981

[30] Foreign Application Priority Data

Sep. 10, 1980 [JP] Japan ................... 55-126251

[51] Int. Cl.³ .............. B65H 3/44; B65H 1/12; B65H 3/06
[52] U.S. Cl. ...................... 271/9; 271/245; 271/127; 271/160
[58] Field of Search ............. 271/243, 245, 246, 9, 271/127, 164, 126, 166, 170

[56] References Cited

U.S. PATENT DOCUMENTS

| | | | |
|---|---|---|---|
| 2,381,546 | 8/1945 | Kreider | 271/246 |
| 3,989,236 | 11/1976 | Komori et al. | 271/9 |
| 4,025,066 | 5/1977 | Sue | 271/9 |
| 4,204,668 | 5/1980 | Yanagawa | 271/9 |

FOREIGN PATENT DOCUMENTS 55-66432  5/1980  Japan ........................ 271/9

Primary Examiner—Bruce H. Stoner, Jr.
Assistant Examiner—James E. Barlow
Attorney, Agent, or Firm—Birch, Stewart, Kolasch & Birch

[57] ABSTRACT

A copying machine includes a single paper supply roller for selectively conducting the paper supply in a manual supply mode wherein a copy paper is introduced through a manual inlet and in an automatic supply mode wherein a copy paper is supplied from a copy paper cassette. A copy paper biasing member is associated with the copy paper cassette so that the copy paper is depressed toward the operating region of the paper supply roller. A manual paper supply guide plate is rotatably secured to the copying machine so that the manual paper supply guide plate takes a first position wherein the manual paper supply guide plate is located under the paper supply roller for conducting the manual paper supply, and a second position not to interfere with the automatic paper supply from the copy paper cassette. A correlation mechanism is connected to the copy paper biasing member to disable the copy paper biasing member when the manual paper supply guide plate is located at the first position.

4 Claims, 7 Drawing Figures

MANUAL/AUTOMATIC PAPER FEED MECHANISM IN A COPYING MACHINE

BACKGROUND AND SUMMARY OF THE INVENTION

The present invention relates to a paper feed mechanism in a copying machine and, more particularly, to a selective control of a mandrel paper supply and an automatic paper supply in a copying machine.

A copying machine has been developed which employs both a manual paper supply system and an automatic paper supply system utilizing a copy paper cassette. In the conventional system of the above-mentioned type, a paper feed roller for the manual paper supply is provided in addition to the paper feed roller for the automatic paper supply. Therefore, the paper feed mechanism is complicated.

Moreover, in the conventional system of the above-mentioned type, a paper stopper is required for precluding an erroneous paper supply from the manual paper feed section when the system is placed in the automatic paper feed mode. The paper stopper is driven by a solenoid mechanism. Further, a paper detection switch system is provided at the downstream of the paper stopper for detecting the provision of the copy paper in the manual paper feed mode, thereby disabling the automatic paper supply system. The above-mentioned solenoid mechanism and the paper detection switch system make the system complicated.

Accordingly, an object of the present invention is to provide a novel paper supply system in a copying machine for selectively supplying a copy paper in the automatic paper supply mode and the manual paper supply mode.

Another object of the present invention is to provide a paper supply system which requires only one paper supply roller for performing the paper supply both in the manual paper supply mode and the automatic paper supply mode.

Still another object of the present invention is to provide a paper supply system of a copying machine with a simple construction.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, only one paper supply roller is provided for conducting the automatic paper supply from a copy paper cassette and the manual paper supply from a manual paper inlet. A manual paper feed guide system is correlated with a copy paper biasing member in the copy paper cassette so that the copy paper will not be fed from the copy paper cassette when the manual paper feed guide system is placed in the manual paper supplying condition.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
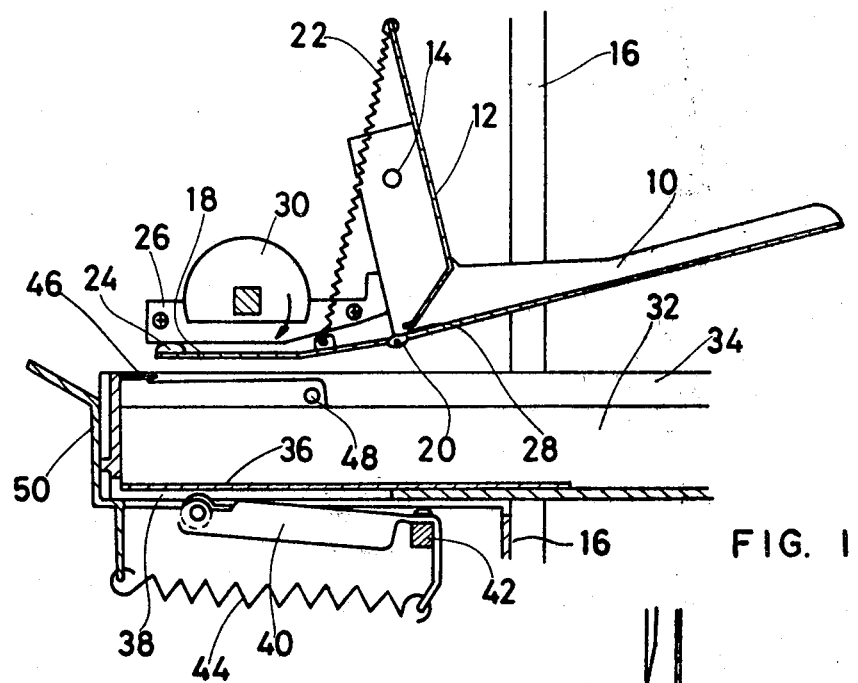
FIG. 1 is a sectional view of an embodiment of a paper supply system of the present invention, which shows a manual supply mode.
Figure 2:
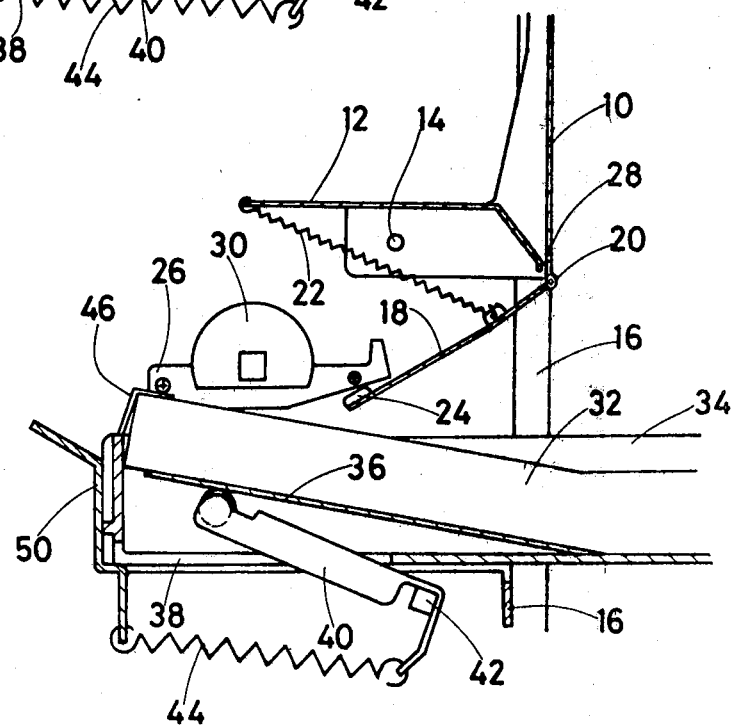
FIG. 2 is a sectional view of the paper supply system of FIG. 1, FIG. 2 showing an automatic supply mode.

FIGS. 1 and 2 show an embodiment of a paper supply system of the present invention, wherein FIG. 1 shows a manual supply mode and FIG. 2 shows an automatic supply mode.

The paper supply system includes a manual paper supply guide plate 10 for guiding a copy paper in the manual supply mode. The manual paper supply guide plate 10 is secured to a shielding plate 12. The shielding plate 12 is rotatably supported by a shaft 14 which is secured to a body frame 16 of the copying machine so that the manual paper supply guide plate 10 is rotatable around the shaft 14 for selectively occupying a first condition suited for the manual supply as shown in FIG. 1 and a second condition suited for the automatic supply as shown in FIG. 2.

A paper feed guide plate 18 is secured to one end of the manual paper supply guide plate 10 via a rotatable shaft 20 in such a manner to rotate around the rotatable shaft 20. One end of a spring 22 is secured to the paper feed guide plate 18, and the other end of the spring 22 is secured to one end of the shielding plate 12 so that the paper feed guide plate 18 is always forced to rotate in the clockwise direction in FIGS. 1 and 2. A contact member 24 is secured to the tip end of the paper feed guide plate 18 in such a manner that the contact member 24 follows a guide member 26 which is secured to the body frame 16. More specifically, the contact member 24 slides on the surface of the guide member 26 in response to the rotation of the manual paper supply guide plate 10 in view of the rotating force created by the spring 22. A manual paper inlet 28 is formed between the end of the shielding plate 12 and the manual paper supply guide plate 10.

In the manual supply mode, as shown in FIG. 1, the manual paper supply guide plate 10 is rotated down, and the paper feed guide plate 18 is positioned below a paper feed roller 30 wich is rotatably secured to the body frame 16. In the automatic supply mode, as shown in FIG. 2, the manual paper supply guide plate 10 is rotated upward so that the paper feed guide plate 18 is removed from the operating region of the paper feed roller 30. The paper feed roller 30 has a semicircular configuration, and is mechanically coupled with a drive source through a clutch mechanism.

In the automatic supply mode, copy paper 32 contained in a copy paper cassette 34 is supplied to the copying machine by means of the paper feed roller 30. A paper support plate 36 is rotatably secured to the bottom wall of the copy paper cassette 34, where an opening 38 is formed in the bottom wall of the copy paper cassette 34. A copy paper biasing member 40 is secured to a shaft 42 which is rotatably supported by the body frame 16. The copy paper biasing member 40 is engaged in the above-mentioned opening 38 so that the copy paper biasing member 40 functions to depress one edge of the copy paper 32 contained in the copy paper cassette 34 upward in the automatic supply mode by means of a spring 44 as shown in FIG. 2. A depression click 46 is rotatably secured around a shaft 48 which is fixed to side walls of the copy paper cassette 34, thereby slightly depressing the front edge of the copy paper 32 contained in the copy paper cassette 34 for ensuring an accurate paper supply. The above-mentioned spring 44 is disposed between one end of the copy paper biasing member 40 and a cassette holder 50.

In the manual supply mode, the paper feed guide plate 18 is disposed below the paper feed roller 30, and the copy paper biasing member 40 is depressed down not to disturb the movement of the copy paper inserted through the manual paper inlet 28. As already discussed above, in the automatic supply mode, the paper feed guide plate 18 is disposed away from the operating region of the paper feed roller 30, and the copy paper biasing member 40 functions to depress the copy paper 32 into the operating region of the paper feed roller 30.

Figure 3:
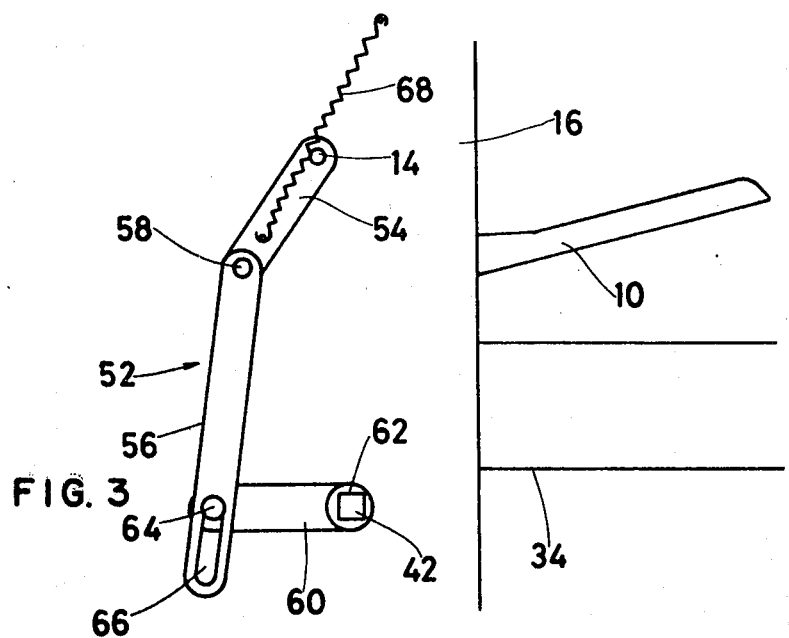
FIG. 3 is a side view of a correlation system included in the paper supply system of FIG. 1, FIG. 3 showing the manual supply mode.
Figure 4:
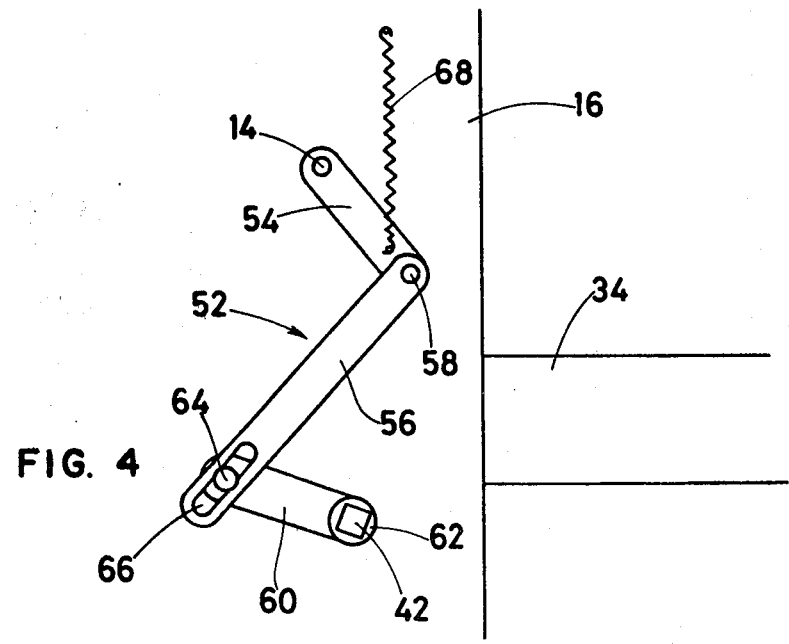
FIG. 4 is a side view of the correlation system of FIG. 3, FIG. 4 showing the automatic supply mode.

The above-mentioned shift movement of the paper feed guide plate 18 and the copy paper biasing member 40 is correlated with the movement of the manual paper supply guide plate 10. FIGS. 3 and 4 show the correlation mechanism, wherein FIG. 3 shows the manual supply mode corresponding to FIG. 1, and FIG. 4 shows the automatic supply mode corresponding to FIG. 2. Like elements corresponding to those of FIGS. 1 and 2 are indicated by like numerals.

The correlation mechanism is disposed at the outer surface of the body frame 16. The shaft 14 is disposed through the body frame 16. A crank mechanism 52 is secured to the extruded end of the shaft 14 and the extruded end of the shaft 42 of the copy paper biasing member 40. The crank mechanism 52 includes a transfer arm 54 fixed to the shaft 14, a crank arm 56 rotatably secured to one end of the transfer arm 54 via a shaft 58, and a coupling arm 60 which is fixed to the shaft 42 via a boss 62 at one end thereof. The other end of the coupling arm 60 is slidably secured to the crank arm 56 as shown in FIGS. 3 and 4 through the use of a shaft 64 secured to the coupling arm 60 and an ellipse opening 66 formed in the crank arm 56. A spring 68 is disposed between the body frame 16 and the transfer arm 54 for stabilizing the movement of the crank mechanism 52.

To conduct the manual paper supply, the manual paper supply guide plate 10 is rotated down and positioned as shown in FIG. 1. The rotation of the manual paper supply guide plate 10 is transferred to the shaft 42 via the crank mechanism 52 so that the copy paper biasing member 40 is located at the position not to depress the copy paper 32 contained in the copy paper cassette 34 upward. That is, the copy paper 32 contained in the copy paper cassette 34 is positioned outside of the operating region of the paper feed roller 30. As already discussed, the paper feed guide plate 18 is positioned below the paper feed roller 30 to guide a copy paper manually introduced through the manual paper inlet 28 toward the operating region of the paper feed roller 30. The rotation of the paper feed roller 30 is initiated when a copy button is actuated after introduction of the copy paper through the manual paper inlet 28.

To conduct the automatic paper supply, the manual paper supply guide plate 10 is rotated upward and positioned as shown in FIG. 2. The paper feed guide plate 18 is positioned away from the operating region of the paper feed roller 30. The copy paper biasing member 40 is rotated via the crank mechanism 52 so that the front edge of the copy paper 32 contained in the copy paper cassette 34 is depressed or directed upward to reach the operating region of the paper feed roller 30. Under these conditions when the copy button is actuated, the paper feed roller 30 is rotated to catch the copy paper 32 contained in the copy paper cassette 34.

Figure 5:
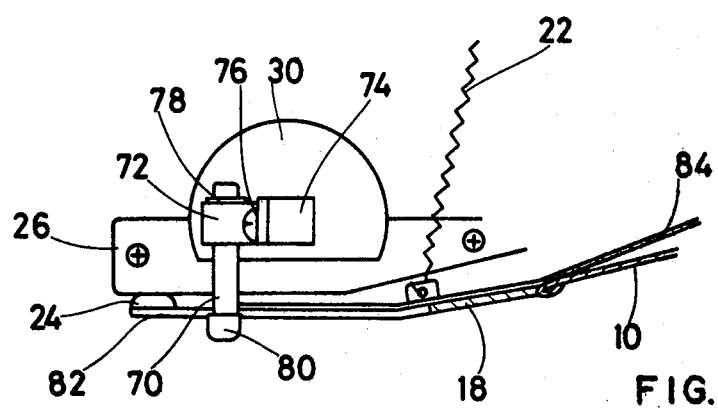
FIGS. 5, 6 and 7 are sectional views of an essential part of another embodiment of the paper supply system of the present invention.

FIG. 5 shows another embodiment wherein a paper stopper 70 is secured to the paper feed roller 30 for ensuring a stable paper feed in the manual supply mode. Like elements corresponding to those of FIGS. 1 and 2 are indicated by like numerals.

A stopper holder 72 is secured to a shaft 74 of the paper feed roller 30 through the use of a screw 76. The paper stopper 70 is slidably supported by the stopper holder 72. The sliding distance is limited by a ring 78 secured to one end of the paper stopper 70 and a coupling member 80 secured to the other end of the paper stopper 70. An opening 82 is formed in the paper feed guide plate 18 at the position corresponding to the location of the paper stopper 70.

Figure 6:
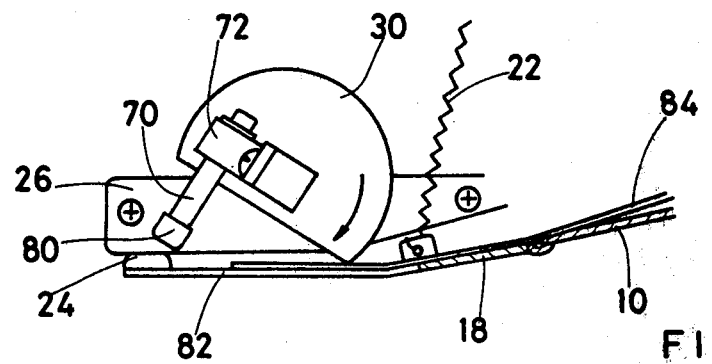
Figure 7:
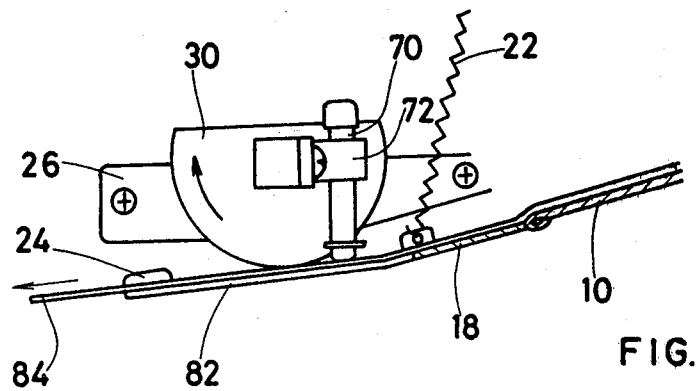

FIG. 5 shows a condition where the paper feed roller 30 is held stationary. A copy paper 84 manually introduced through the manual paper inlet 28 is held stationay at a position where the leading edge thereof contacts the paper stopper 70 as shown in FIG. 5. When the copy button is actuated under these conditions, the paper feed roller 30 begins to rotate. In response thereto, the leading edge of the copy paper 84 is released from the paper stopper 70 as shown in FIG. 6. FIG. 7 shows a condition wherein the copy paper 84 is transferred by the paper feed roller 30. The copy paper 84 is forced to contact the rotating paper feed roller 30 by the spring 22 connected to the paper feed guide plate 18.

The invention being thus described, it will be obvious that the same may be varied in many ways. Such variations are not to be regarded as a departure from the spirit and acope of the invention, and all such modifications are intended to be included within the scope of the following claims.

What is claimed is:

1. A manual/automatic paper supply system for use in a copying machine comprising in combination:
a paper feed system including a paper feed roller;
a cassette holder for holding a copy paper cassette beneath said paper feed system;
biasing means for directing copy paper contained in said copy paper cassette toward an operating region of said paper feed roller;
a paper supply means for the manual feed of individual sheets of copy paper to said copying machine juxtapositioned to said paper feed system above said cassette holder said paper supply means comprising a manual paper supply guide plate and a paper feed guide plate, said paper supply means being capable of occupying a first position such that said paper feed guide plate is located beneath said paper feed roller for conducting the manual supply of copy paper to said copying machine upon selection of a manual paper feed mode, and a second position such that said paper feed guide plate is displaced from said operating region of said paper feed roller means upon selection of an automatic paper feed mode; said paper supply system being rotatably secured to said copying machine such that said paper feed guide plate will pivot from said first position to said second position and back to said first position, into and out of the operating region of said paper feed roller in response to the selection of said manual or automatic mode of operation; and a correlation means for disabling said biasing means when said paper supply means is located in said first position.

2. The manual/automatic paper supply system of claim 1, which further comprises a paper stopper slidably secured to said paper feed roller for catching a leading edge of a copy paper manually introduced along said manual paper supply guide plate.

3. The manual/automatic paper supply system of claim 1 or 2, including a spring means secured to said paper feed guide plate for stabilizing said paper supply means in either of said first position or said second position.

4. The manual/automatic paper supply system of claim 1 or 2, said correlation means comprising a crank mechanism disposed between said biasing means and said paper supply means.

* * * * *